(12) United States Patent
Carlson et al.

(10) Patent No.: US 7,686,751 B2
(45) Date of Patent: Mar. 30, 2010

(54) BOARD SPORT TRAINING DEVICE AND METHOD OF USE

(75) Inventors: Mark A. Carlson, Cupertino, CA (US); Andrew Lewis Johnston, Redwood City, CA (US); Craig Hines, San Francisco, CA (US)

(73) Assignee: Simbal Sports, LLC, Cupertino, CA (US)

( * ) Notice: Subject to any disclaimer, the term of this patent is extended or adjusted under 35 U.S.C. 154(b) by 130 days.

(21) Appl. No.: 11/975,861

(22) Filed: Oct. 22, 2007

(65) Prior Publication Data

US 2009/0105057 A1  Apr. 23, 2009

(51) Int. Cl.
*A63B 22/14* (2006.01)

(52) U.S. Cl. .......................... 482/146; 482/34

(58) Field of Classification Search ......... 482/146–147, 482/34, 79, 51; 280/600, 190, 841–842, 280/87.042
See application file for complete search history.

(56) References Cited

U.S. PATENT DOCUMENTS

| | | | |
|---|---|---|---|
| 1,981,379 A | 11/1934 | Thomson et al. | |
| 2,941,801 A | 6/1960 | Pederson | |
| 2,964,315 A | 12/1960 | Dinning | |
| 3,438,626 A | 4/1969 | Modla | |
| 4,850,588 A | 7/1989 | Desjardins et al. | |
| 5,048,823 A | 9/1991 | Bean | |
| 5,062,629 A | 11/1991 | Vaughan | |
| 5,399,140 A | 3/1995 | Klippel | |
| 5,496,248 A | 3/1996 | Batscher | |
| 5,509,871 A | 4/1996 | Giovani | |
| 5,584,787 A * | 12/1996 | Guidry | 482/146 |
| 5,613,690 A | 3/1997 | McShane et al. | |
| 5,643,164 A * | 7/1997 | Teff | 482/146 |
| 5,730,690 A * | 3/1998 | Guidry | 482/146 |
| 5,795,277 A * | 8/1998 | Bruntmyer | 482/146 |
| 5,851,166 A | 12/1998 | Bernardson | |
| 5,897,474 A * | 4/1999 | Romero | 482/146 |
| 6,042,521 A | 3/2000 | DeGiorgis | |
| 6,168,551 B1 * | 1/2001 | McGuinness | 482/51 |
| 6,543,769 B1 * | 4/2003 | Podoloff et al. | 273/148 B |
| 6,592,150 B2 | 7/2003 | Kernan | |
| 6,616,583 B1 * | 9/2003 | Stack | 482/146 |
| 6,666,797 B1 | 12/2003 | Martin | |
| 6,805,658 B2 * | 10/2004 | Desberg et al. | 482/146 |
| 6,916,276 B1 | 7/2005 | Robinson | |
| 6,942,604 B2 | 9/2005 | Teff | |
| 7,300,392 B1 | 11/2007 | Curran | |
| 2003/0017922 A1 | 1/2003 | Sachs | |
| 2003/0060337 A1 | 3/2003 | Yu | |

(Continued)

OTHER PUBLICATIONS

U.S. Patent and Trademark Office, Office Action issued in U.S. Appl. No. 11/639,591, dated Dec. 19, 2008.

*Primary Examiner*—Lori Baker
(74) *Attorney, Agent, or Firm*—Westberg Law Offices

(57) ABSTRACT

A board sport training device comprises a base configured for attachment to a platform such that the base is disposed beneath the platform. The base comprises a plurality of separate base portions, each base portion comprising at least two bowl-shaped pivot areas and each base portion having sufficient flexibility that each base portion conforms to a curved bottom surface of the platform. A plurality of the pivot areas are positioned along a longitudinal axis of the platform and separated by a distance from the platform.

19 Claims, 4 Drawing Sheets

U.S. PATENT DOCUMENTS

2004/0224824 A1 11/2004 Lickle
2006/0217242 A1* 9/2006 Karpachev .................. 482/77
2007/0149365 A1 6/2007 Carlson
2007/0149374 A1 6/2007 Carlson

* cited by examiner

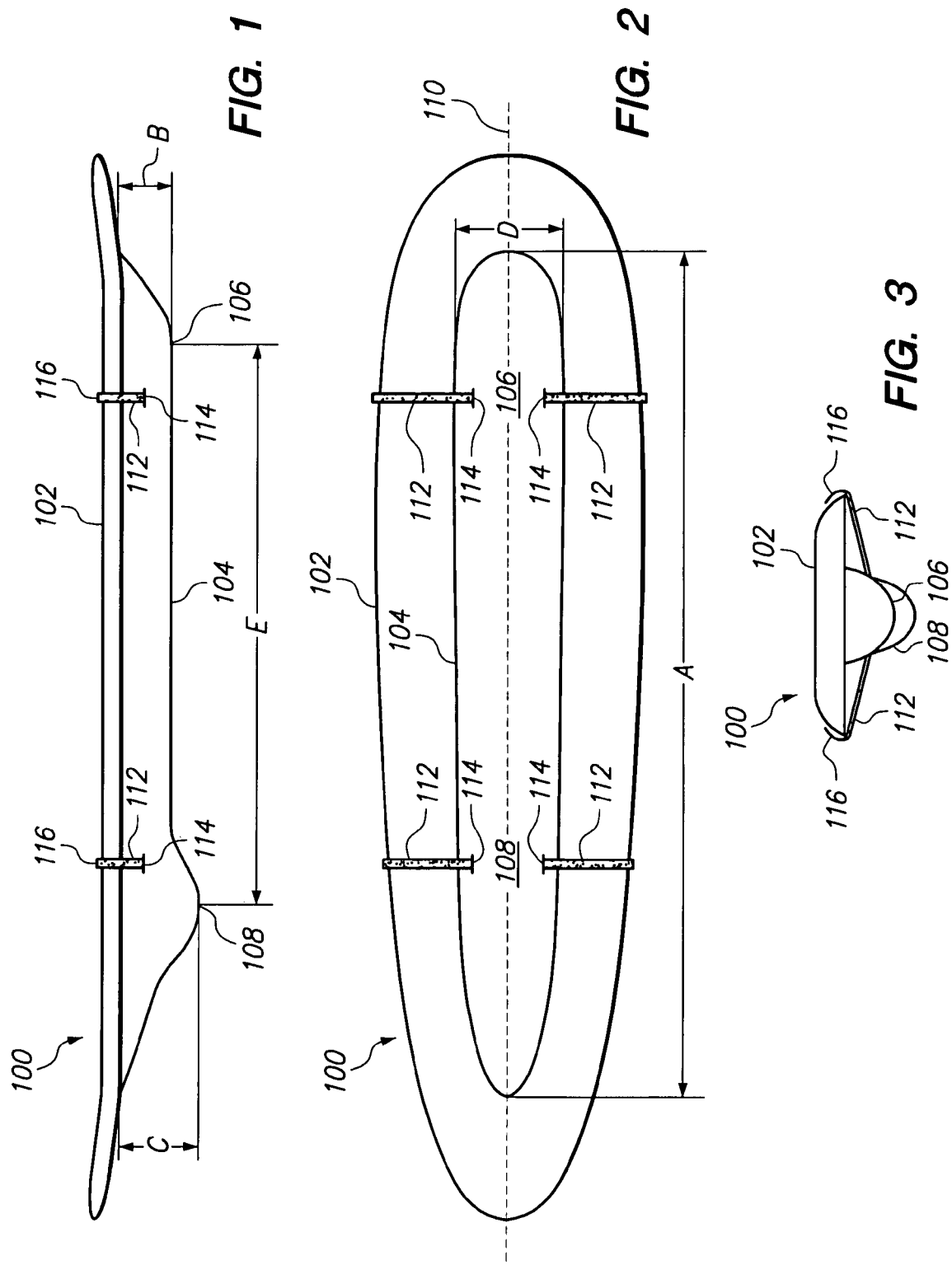

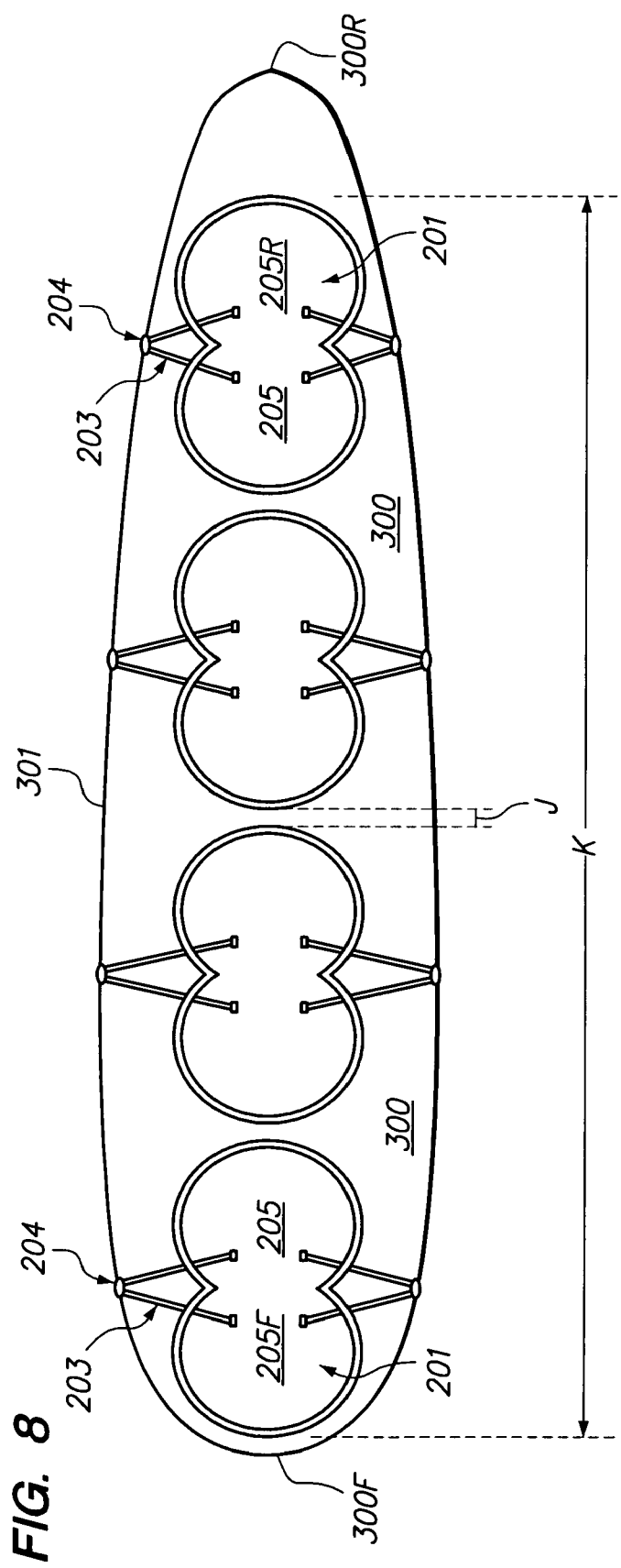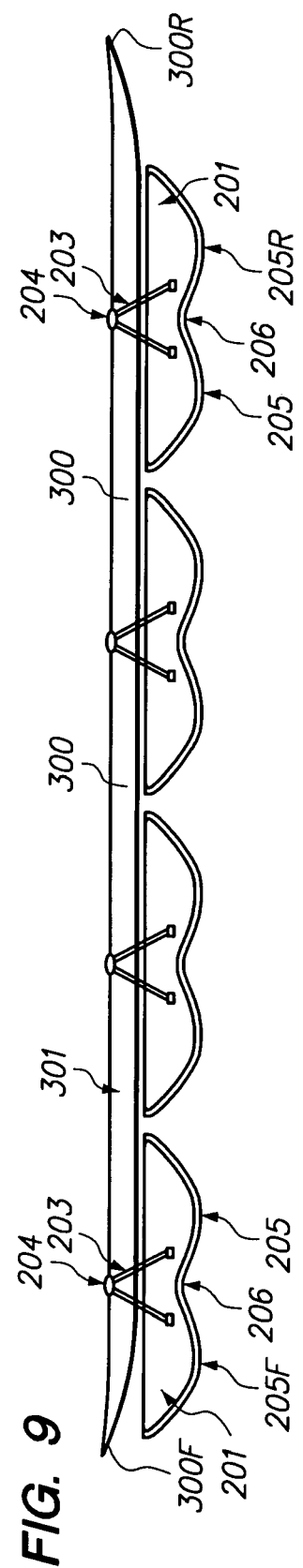

BOARD SPORT TRAINING DEVICE AND METHOD OF USE

This application contains subject matter which is related to U.S. patent application Ser. No. 11/639,591, filed Dec. 15, 2006, which is a continuation-in-part of U.S. patent application Ser. No. 11/318,204, filed Dec. 23, 2005, the entire contents of all of which are hereby incorporated by reference.

FIELD OF THE INVENTION

The present invention relates to the field of training devices for board sports.

BACKGROUND OF THE INVENTION

Board sports such as surfing, windsurfing, snow boarding, skateboarding, wake boarding, and others require the use of advanced balancing skills in an unstable and dynamic environment. Additional skills also must be mastered. For surfing, these skills include the ability to quickly move from a prone position (on one's stomach) to a standing position, the ability to step to an appropriate position on the board to speed up or slow down, the ability to adjust the body to perform proper turning technique and the ability to perform advanced maneuvers, such as cross-stepping and drop-knee turns. It can be difficult to practice these skills in the customary environment for the sport, such as surfing in the water, because the opportunities to practice are limited. In addition, the customary environment may not allow the needed movements and balancing to be repeatedly practiced.

Simulators have been developed that use external forces generated by mechanical devices, such as motors, pumps, springs and the like to move and tilt a surfboard-like standing platform. In reality, the movement of a surfboard is mostly controlled by changing the vertical and horizontal position and foot pressure of the surfer. These simulators tend to generate board motions independent of the rider's foot positions, pressures, and vertical position of the center of the gravity and, thus, do not effectively help the users' ability to control and manipulate the surfboard.

Balancing devices, such as the Indo Board™ which has a flat board surface with a separate cylindrical drum beneath the board, have also been designed or developed to help practice balancing skills. However, these devices are limited in their movement and do not accurately reflect the stepping, cross-stepping, and turning techniques that are useful in an actual surfing ride.

The devices discussed above tend to require a hard surface in order to be used and may even require electricity. This can make them impractical for use at beaches, where most surf school classes are conducted.

Thus, there is a need for an improved training device for board sports. It is toward this end that the present invention is directed.

SUMMARY OF THE INVENTION

The present invention provides a board sport training device and a method of use. In accordance with an embodiment, a board sport training device comprises a base configured for attachment to a platform such that the base is disposed beneath the platform. The base comprises a plurality of separate base portions, each base portion comprising at least two bowl-shaped pivot areas and each base portion having sufficient flexibility that each base portion conforms to a curved bottom surface of the platform. A plurality of the pivot areas are positioned along a longitudinal axis of the platform and separated by a distance from the platform.

In accordance with another embodiment, a board sport training device comprises an elongated platform for receiving a user and a plurality of separate base portions disposed beneath the platform. The base portions each comprise at least two bowl-shaped pivot areas coupled to together by a hinge such that each base portion conforms to a curved surface of the platform. A plurality of the pivot areas are positioned along a longitudinal axis of the platform and separated by a distance from the platform.

In accordance with yet another embodiment, a board sport training device comprises a base configured for attachment to a platform such that the base is disposed beneath the platform. The base comprises a plurality of separate base portions, each base portion comprising at least two bowl-shaped pivot areas coupled to together by a hinge having sufficient flexibility that each base portion conforms to a curved bottom surface of the platform. A plurality of the pivot areas are positioned along a longitudinal axis of the platform and separated by a distance from the platform.

These and other aspects of the invention are described in more detail herein.

BRIEF DESCRIPTION OF THE DRAWINGS

FIG. 1 illustrates a side view of a board sport training device in accordance with an embodiment of the present invention;

FIG. 2, illustrates a bottom view of the board sport training device in accordance with an embodiment of the present invention;

FIG. 3 illustrates a front view of the board sport training device in accordance with an embodiment of the present invention;

FIG. 8 illustrates a bottom view of four pods of the board sport training device attached to a platform in accordance with an embodiment of the present invention.

FIG. 9 illustrates a side view of four pods of the board sport training device attached to the bottom surface of a platform in accordance with an embodiment of the present invention;

DETAILED DESCRIPTION OF THE INVENTION

Figure 4:
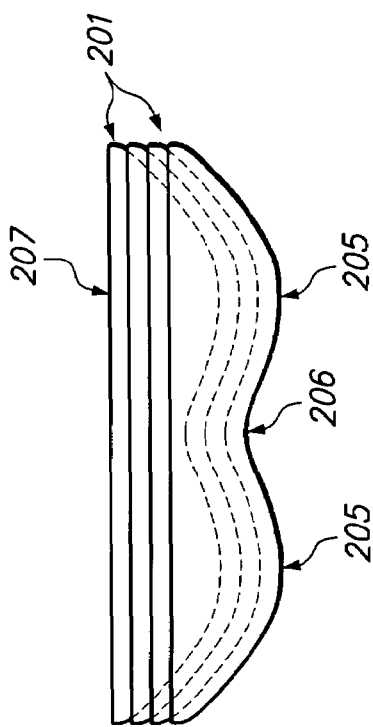
FIG. 4, illustrates a bottom view of a single pod of the board sport training device in accordance with an embodiment of the present invention.

The invention provides a training and practice device for developing balance and coordination in general, and specifically for developing a natural body movement in unstable and dynamic circumstances similar to surfing or windsurfing on water. The device allows surfers to practice a combination of realistic balancing skills concurrent with the techniques of standing, stepping, and turning. Unlike prior training devices, the present invention permits the users to experience the real sensation of how their position and technique can control not only their balance but also the direction and the speed of the surfboard. This is particularly true on a long board, where stepping, cross-stepping, drop-knee turns, and other techniques are utilized.

The skills gained from such practice can also benefit other board sports such as windsurfing, snow boarding, skateboarding, wake boarding, and other board related sports. The invention is transportable and durable (even in a natural shoreline environment) which make it very easy for surfers and trainees to bring it along to practice where the learned skills can be put in use immediately.

The board sport training device can be used in conjunction with a computerized simulator. For example, one or more transducers may detect the positioning of the board sport training device and possibly also the positioning of the user. This positioning information may be converted to an electrical form which is suitable for input to a computer having software which enables the computer to function as simulator. The computer simulator may then reflect the positioning information on a display screen visible to the user.

FIG. 1 illustrates a side view of a board sport training device 100 in accordance with an embodiment of the present invention, while FIG. 2 illustrates a bottom view of the board sport training device 100. As shown in FIGS. 1 and 2, the device comprises an elongated platform 102 and a base 104. A commercially available conventional surfboard may comprise the platform 102. Alternatively, the platform 102 may be constructed specifically for use as part of the training device 100.

The base 104 is disposed beneath the platform 102 and comprises a front pivot area 106 and a rear pivot area 108. The base 104 is preferably formed as a unitary body of which the front pivot area 106 and the rear pivot area 108 are portions. For example, the base 104 may be constructed from a substantially rigid material, for example, a plastic, such as polyethylene, polyvinylchloride or acrylonitrile butadiene styrene (ABS), or fiberglass. The base 104 may be formed as a substantially hollow shell of the substantially rigid material. Alternatively, the base may be of substantially solid construction. For example, the base 104 may be formed as a shell of substantially rigid material having a substantially solid core, which may, for example, include a foam plastic such as polystyrene.

The base 104 may be coupled to the bottom surface of the platform 102 using straps 112. For example, the straps 112 may pass through apertures 114 in the base and terminate in hooks 116 which grasp edges of the platform. Alternatively, the straps may be wrapped around the platform 102. The straps 112 allow the base 104 to be easily attached to a platform 102 for use as a training device and then easily removed when the user is ready to try their skills in the water. Thus, the top surface of the base 104 may be shaped to adapt to the bottom surface of a specific board (surfboard, windsurf board, snowboard, skateboard, wakeboard, or others). Where the platform 102 is a conventional surfboard or other type of board having one or more skegs (i.e. fins), these may be removed before the base 104 is attached.

Alternatively, rather than the platform 102 and the base 104 being separable, they may be constructed as a unitary body. For example, the platform 102 and the base may be formed as a single piece of molded plastic or fiberglass.

The front pivot area 106 and the rear pivot area 108 are positioned substantially along a longitudinal axis 110 (FIG. 2) of the platform 102 and separated by a distance from the bottom surface of the platform 102. For example, the distance between the bottom surface platform 102 and the front pivot area 106 may be a maximum of approximately 4-5 inches, while the distance between the bottom surface of the platform 102 may be a maximum of approximate 7-8 inches. In other words, the maximum height of the base 104 at the front pivot area is approximately 4-5 inches, while the maximum height of the base 104 at the rear pivot area 108 is approximately 7-8 inches. In addition, the front pivot area 106 and the rear pivot area 108 are separated by a distance from each other. This distance is sufficient to allow room for the user to step to various positions along the platform 102 between the front pivot area and the rear pivot area while performing side-to-side balancing. Therefore, the distance between the front pivot area 106 and the rear pivot area 108 may be at least two feet, and is preferably approximately three to seven feet or more, depending upon the length of the platform 102. It will be apparent that the dimensions described herein can be varied. As can be seen from FIG. 2, the base 104 at the rear pivot area 108 is preferably taller than it is at the front pivot area 106. The width of the base 104 may be between 25% and 95% of the typical board's lower surface width. The length of the base 104 may be between 25% and 90% of the typical board's lower surface length. Thus, as shown in FIG. 2 exemplary dimensions of the device 100 for a 9.5 foot long board may be as follows: the base may be approximately 7 feet long (dimension A in FIG. 2); the front pivot area 106 may be separated by a distance from the platform 102 by approximately 4-5" (dimension B in FIG. 2); the rear pivot area 108 may be separated by a distance from the platform 102 by approximately 7-8" (dimension C in FIG. 1); the base may be approximately 6-12" wide (dimension D in FIG. 2) and the distance between the front pivot area 106 and the rear pivot area 108 may be approximately 4-½ feet (dimension E in FIG. 1). It will be apparent, however, that other dimensions may be selected.

FIG. 3 illustrates a front view of the board sport training device 100. From FIG. 3, it can be seen that the front pivot area 106 and the rear pivot area 108 are substantially semi-circular in cross-section. In a preferred embodiment, the front pivot area 106 and the rear pivot area 108 are substantially semi-elliptical in cross-section. The semi-elliptical and/or semi-circular bottom surface of the base 104 interacts with the ground surface on which one has chosen to use the device.

Referring to FIGS. 2 and 3, the base 104 is preferably tapered both in height and width at its ends where it meets the bottom surface of the platform 102. In addition, the base 104 is preferably contoured so that the tapered ends smoothly blend with the front and rear pivot areas 106 and 108. Also, the base 104 is preferably contoured so that it smoothly transitions from the rear pivot area 108 to the front pivot area 106, the rear pivot area 108 having greater height than the front pivot area 106. To facilitate rotation of the training device 100 about the rear pivot area 108, the dimension of the rear pivot area 108 is preferably limited in the longitudinal direction. This may be accomplished by contouring the base 104 such that its height is gradually decreasing at all sides of the rear pivot area 108, thus, forming a substantially rounded profile seen from the side of the device 100 as in FIG. 2 and as seen from the front of the device 100 as in FIG. 3.

Many surf school classes occur at the beach where the instructors can demonstrate and the students can experience the actual waves immediately after the class instruction on the beach. Thus, the device 100 is suited for use on a soft ground surface, such as wet sand near the water, grass or dirt. The device may also be used on hard surfaces such as pavement. To use the device 100, the device 100 is placed with the base 104 on the ground surface so that the front pivot area 106 and the rear pivot area 108 are in contact with the ground surface. The platform 102 is then pivotable from side-to-side, thus, simulating the instability encountered while surfing or windsurfing on water. This allows the user to perform side-to-side balancing so long as a center of gravity of the device and the user is between the front and rear pivot areas 106 and 108. Paddling, moving from a prone paddling position to a standing position, turning and stepping maneuvers may also be practiced while performing side-to-side balancing with the device 100 in this position. Stepping toward the front of the platform 102 simulates a maneuver which would increase the speed of a surfboard while stepping toward the rear of the platform 102 simulates a maneuver which would decrease the speed of a surfboard.

The rear pivot area 108 is inset from a rear end of the platform such that the platform is rotatable about the rear pivot area 108 when only the rear pivot area 108 is in contact with the ground surface. Thus, the user may move to a position on the platform 102 such that a center of gravity of the device and the user is over the rear pivot area. For example, the user may place one foot behind the rear pivot area 108 and one foot in front of the rear pivot area 108 so that the front pivot area 106 can be lifted off of the ground and the device may be rotated about the rear pivot area 108. This allows the user to practice turning maneuvers. Because the base 104 is taller at the rear pivot area 108, the front pivot area 106 can be lifted off of the ground while the platform 102 is substantially parallel with the ground.

The location of the rear pivot area 108 may depend upon the specific board sport (surfboard, windsurf board, snowboard, skateboard, wakeboard, or others) for which the device 100 is used. For example, a typical surfboard will have the pivot point nearer the aft portion of the board. Where the device 100 is used for windsurfing, this pivot area may be closer to the center, being nearly below the mast of the typical windsurf board.

As previously described, the base 104 may be formed as a unitary body. In an alternative embodiment of the invention, the base is effectively partitioned into a plurality of base portions, which are referred to herein as "pods." These pods are separate from each other and may be attached to the bottom surface of a platform (for example, a surfboard or windsurf board) along its longitudinal axis and provide essentially the same functionality as the base 104 of the previously described embodiment of this invention. The pods are preferably separable from the platform for transportation and storage and so that the platform can be used for other purposes. For example, when the platform is a surfboard, the pods can be removed so that the surfboard can be used in a conventional manner.

Similar to the base 104 described above, the pods may be constructed from a substantially rigid material, for example, a plastic, such as polyethylene, polyvinylchloride or acrylonitrile butadiene styrene (ABS), or fiberglass.

Although this embodiment of the present invention is partitioned into multiple pods, when used together as described in detail below, they accomplish the same wide range of useful functional elements of balance and technique training for board sports that the aforementioned and described embodiment of the invention that is one unitary body.

Each pod has at least one convex protrusion which forms a bottom surface pivot area. In a preferred embodiment, each pod comprises two semi-circular convex protrusions which form the bottom surface pivot area. In this case, the two semi-circular protrusions are preferably separated by a swale or depression in the pod's lower surface area. Each pod has a substantially flat top surface perimeter which mates with the substantially flat bottom surface of a platform (e.g., a surfboard). The majority of the top surface area within the perimeter of each pod is shaped as two concave (bowl-like) semi-circular shapes in the same proportion as the two semi-circular convex protrusions that form the bottom surface area of the pod. Thus, each pod may be formed from a single flat sheet of material that is molded through pressure and/or heat. The bowl-like concave shapes of each pod allow a plurality if the pods to be stacked together for convenient storage and cost effective packaging and shipping. The pods are stacked by the convex protrusions of one or more of the separable portions extending into the concave indentations of another one of the separable portions.

The pods are preferably attached to the platform by elastic straps which are preferably attached to an edge (i.e. its rail) of the platform by hooks or clips at one end of each strap. The other end of each strap is preferably attached to the pod.

Figure 6:
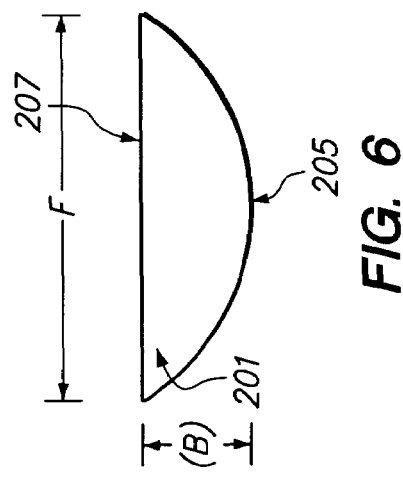
FIG. 6, illustrates a front, or a rear, view of a single pod of the board sport training device in accordance with an embodiment of the present invention.
Figure 5:
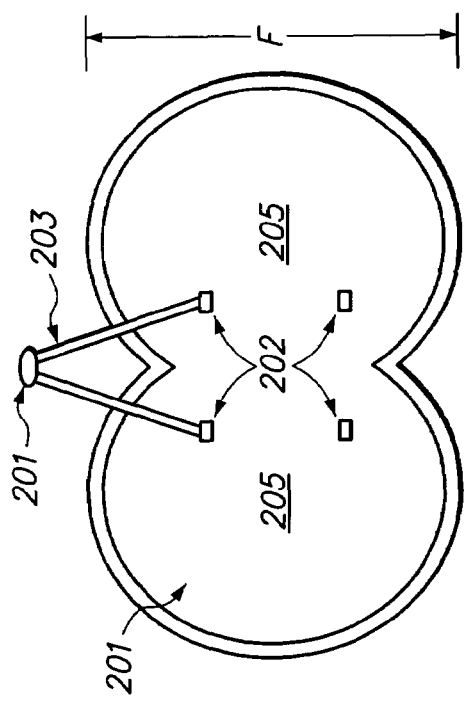
FIG. 5, illustrates a side view cross-section of a single pod of the board sport training device in accordance with an embodiment of the present invention.

FIG. 4 illustrates a bottom view of a single pod 201 of the board sport training device in accordance with another embodiment of the present invention, while FIG. 5 illustrates a side view cross-section of a single pod 201 of the board sport training device. FIG. 6 illustrates a front view of a single pod 201 of the board sport training device. The rear view of a single pod 201 is a mirror image from the front view. Thus, FIG. 6 illustrates the convex pivot areas of the pods 201 which allow the board sport training device to pivot from side-to-side when placed on a ground surface.

Each pod 201 of the board sport training device may have attachment points 202 to which straps 203 are fixed at one end which secure the attachment of the pod 201 to the platform. Curved hooks 204 are preferably disposed at the other end of each of the elastic straps 203. The hooks 204 wrap around the platform rails 301 (FIG. 9).

Each pod 201 preferably comprises two substantially semi-circular convex protrusions 205 which form the bottom lower surface pivot area. The two convex protrusions 205 are preferably separated by a swale or depression 206 in the pod's lower surface area. Each pod 201 preferably has a substantially flat top surface perimeter area 207 to accommodate attachment to the substantially flat bottom surface of a platform 300.

Figure 7:
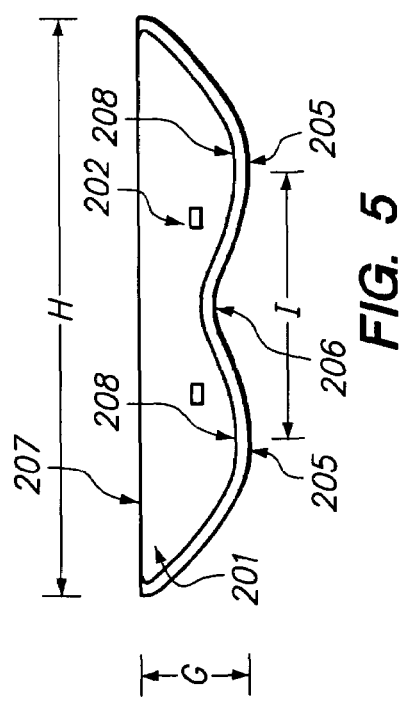
FIG. 7, illustrates a side view of four pods of the board sport training device which have been stacked for packing, shipping, or storage in accordance with an embodiment of the present invention.

The flat top surface area of the pod 207 is preferably limited to the perimeter of the pod 201. The majority of the top surface area of the pod comprises two concave (bowl-like) semi-circular shapes 208 in the same proportion as the two semi-circular convex protrusions 205 that form the bottom surface area of the pod. The bowl-like concave shapes 208 of the pod will allow for multiple pods to be stacked together for convenient storage and cost effective packing and shipping. FIG. 7 illustrates a side view of multiple pods 201 stacked for packing, shipping, and storage.

Exemplary dimensions for the pods 201 may be as follows: The horizontal width (F) may be between approximately eight and eighteen inches and is preferably approximately fourteen inches. The horizontal length (H) may be between approximately twelve and thirty inches and is preferably approximately twenty-one inches. The distance (I) between the two peaks of protrusions 205 of each pod is preferably approximately half of the length H. Accordingly, the distance (I) may be between approximately six and fifteen inches and is preferably approximately ten and one-half inches. It will be apparent the dimensions given herein are exemplary and can be varied.

FIG. 8 illustrates a bottom view of multiple pods 201 of the board sport training device attached to the bottom surface of the platform 300. The pods 201 of the board sport training device are attached along the longitudinal distance (K) of the platform 300. The distance K depends upon the length of the platform, but typically may be approximately five to seven feet. As shown in FIG. 8, the pods 201 are preferably spaced apart from each other by a distance (J). The distance (J) can be adjusted by the user to allow use of varying sizes and/or types of platforms 300. The distance (J) may depend upon the strength and rigidity of the platform, and can range from zero inches to several feet. The distance (J) may typically between zero and twelve inches.

FIG. 8 also illustrates that each pod 201 is attached to the platform 300 by stretching the straps 203 to the width of the platform's rails 301 and attaching the strap hooks 204 to the rails 301. The number of pods 201 attached to a particular platform 300 will depend upon the length of the platform 300 that is being used. A longer board platform 300 may require the use of three or four pods 201. A shorter board platform 300 may require only the use one or two pods 201 to accomplish the technique and balance training task.

FIG. 9 illustrates a side view of multiple pods 201 of the board sport training device attached to the bottom surface of a platform 300 (i.e. a surfboard). The pods 201 of the board sport training device are attached in sequence along the longitudinal distance (K) of the platform 300. The pods 201 are placed a distance (J) apart from each other. The distance (J) can be adjusted by the user to allow use of varying sizes and/or types of platforms 300.

FIG. 9 also illustrates that each pod 201 is symmetrically designed so that it can function equally well as the forward pivot point 205F if it is placed at or near the front of the platform 300F, or the rear pivot point 205R if it is placed towards the rear of the platform 300R. The two convex protrusions of a pod 201 may be of the same height. In addition, each pod 201 may be identical to the others 201 such that all of the pivot areas of the pods 201 are substantially the same distance from the bottom surface of the platform 300.

Typically, sports boards such as surfboards, windsurf boards and wakeboards have a lower surface which is curved along its length. This curvature may be referred to as "rocker." This is shown in FIG. 9 by a front portion 300F and a rear portion 300R of the platform 300 being curved upward relative to the middle of the platform 300. The amount of curvature will depend upon the design of the particular platform 300 being used and, thus, the amount of curvature may be greater or less than that shown in FIG. 9. The curvature may extend along the entire length of the platform 300 and may differ along the length of the platform. Accordingly, a potential problem associated with the novel attachment of multiple pods 201 to the platform 300 is that the top surface of the pods 201 may not conform well to the curvature of the platform 300. To solve this, the pods 201 may be provided with sufficient flexibility that they can conform to platforms 300 having a variety of different curvatures. In addition, the pods have sufficient rigidity that they can support the weight of the platform 300 and user.

Figure 10A:
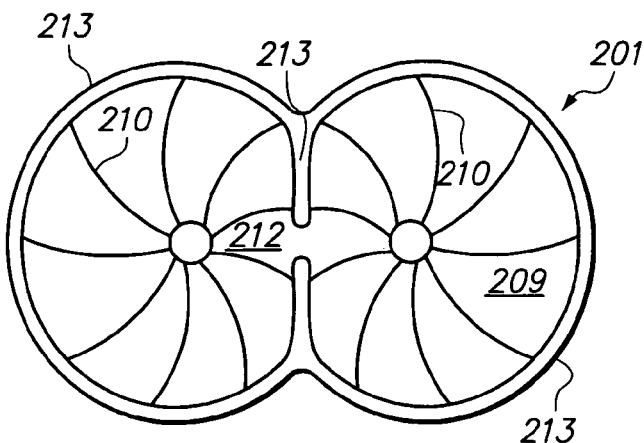
FIGS. 10A-C illustrate top, bottom and side views, respectively, of a single pod of the board sport training device in accordance with an embodiment of the present invention.
Figure 10B:
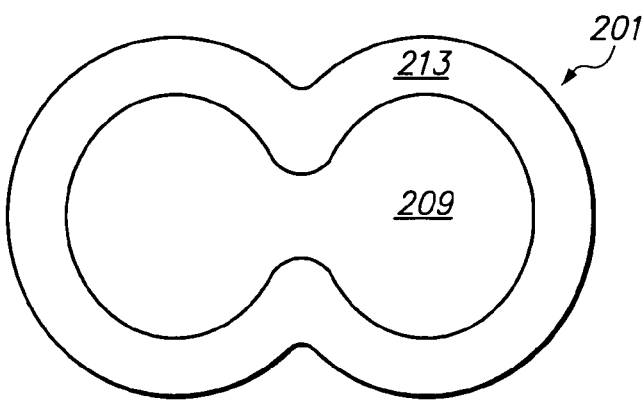
Figure 10C:
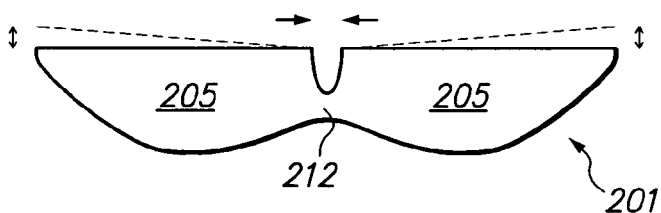

FIGS. 10A-C illustrate top, bottom and side views, respectively, of a single pod 201 of the board sport training device in accordance with an embodiment of the present invention. In this embodiment, the pods 201 are each constructed so that the bowl-shaped portions 205 are coupled to each other by a hinge in the area of the swale 206, which allows the pods 201 to have sufficient flexibility that they can conform to platforms 300 having a variety of different curvatures. Located on either side of the strip 212 are gaps in the rigid material (these gaps me be referred to as "flex gaps." In addition, the two bowl-shaped portions 205 of each pod 201 have substantial rigidity to support the weight of the platform 300 and user. While not shown in FIGS. 10A-C, the pods may be removably attached to the platform by the straps 203 shown in FIGS. 8 and 9.

To achieve the rigidity, the bowl-shaped portions 205 of the pods 201 may be formed primarily of a substantially rigid material, such as a hard plastic (e.g. polyethylene, polyvinylchloride or acrylonitrile butadiene styrene (ABS)) or fiberglass. In a preferred embodiment, this material is a molded plastic which incorporates structural ribbing. To achieve the flexibility, the substantially rigid, bowl-shaped portions 205 of the pods may be connected by a relatively thin strip of the same material, which functions as a hinge. In addition, a perimeter of the bowl-shaped portions 205 may comprise a flexible rubber-like material, such as synthetic or natural rubber, or silicon. This flexible material may contact the lower surface of the platform 300, conforming to its shape. This flexible material tends to distribute, more evenly, the weight load when the board sport training device is being used. It also tends to protect the bottom surface of the platform 300 in the areas of contact with the pods 201. In addition, the flexible material tends to inhibit movement of the pods 201 with respect to the platform 300 while they are attached.

Figure 11:
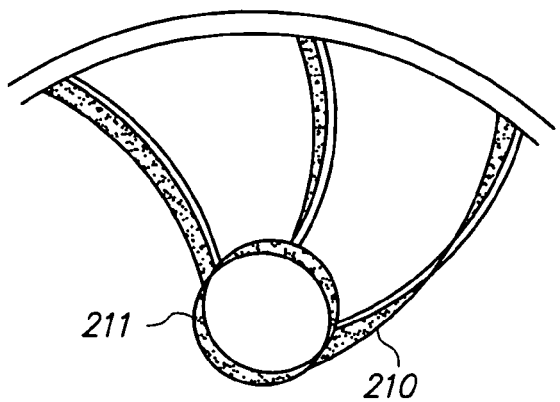
FIG. 11 illustrates detail of structural ribbing of a pod of the board sport training device in accordance with an embodiment of the present invention.

As shown in FIGS. 10A-C, a substantially rigid portion 209 of each pod 201 having structural ribbing 210, 211 may comprise the bowl-shaped portions 205 of the pods 201. FIG. 11 illustrates detail of the structural ribbing 210, 211 of a pod 201 of the board sport training device in accordance with an embodiment of the present invention. Particularly, the bowl-shaped portions 205 may have a substantially smooth, convex outer surface with the ribbing 210, 211 being located on the inner, concave surfaces of the bowl-shaped portions 205. The ribbing may include a central rib 211 at the deepest part of the concave surface. In an embodiment, the central rib 211 is cylindrical. In addition, the ribbing may include outer ribs 210 which are formed as a spiral originating from the central rib 211. The ribbing may be molded from the same material and at the same time as the remainder of the substantially rigid portion 209. The ribbing may have a height of approximately 0.25 to 0.75 inches.

The bowl-shaped portions 205 are coupled together by a strip 212 which functions as a hinge. FIG. 10C illustrates movement of the bowl-shaped portions 205 relative to each other about the strip 212. The strip 212 may be molded of the same material as the rigid portion 209, but is able to function as a hinge due its relatively narrow shape and lack of ribbing at the location of the hinge.

In addition, a flexible, rubber-like material 213 may to attached to a perimeter of the bowl-shaped portions 205. In an embodiment, the rigid portion 209 is formed and, then, the flexible material 213 is molded over the rigid portion. As shown in FIG. 10A, the flexible material 213 is located at the peripheries of the bowl-shaped portions 205 so as to contact and conform to the lower surface of the platform 300. And, as shown in FIG. 10B, the flexible material 213 may be molded over at least some of the lower surface of the rigid portion 209. The flexible material 213 may also occupy areas (the "flex gaps") on either side of the strip 212. The flexible material 213 may be molded in a color which contrasts that of the rigid portion 209 to achieve an aesthetically pleasing appearance.

A method of board sport training may be performed using the training device composed of the separate base portions, as in FIGS. 4-11. The method may include the following steps:

A training device is obtained which comprises an elongated platform 102 for receiving a user and a base 104 disposed beneath the platform, the base comprising a plurality of separate base portions or pods 201 having at least a front pivot area and a rear pivot area. The front pivot area and the rear pivot area are positioned along a longitudinal axis of the platform and separated by a distance from the platform 102. The rear pivot area is separated by a distance from a rear end of the platform.

A user is positioned on the platform 102 at various positions between the front pivot area and the rear pivot area such that a center of gravity of the device and the user is between the front and rear pivot areas and the user performs side-to-side balancing. Because several of the base portions or pods 201 may be present, there may be additional pivot areas which contact the ground surface at different times while the user moves among the various positions.

In addition, the user may be positioned on the platform such that a center of gravity of the device and the user is over the rear pivot area such that the user rotates the device about the rear pivot area. The method may include the user moving from a prone paddling position to a standing position while performing side-to-side balancing. The user may step along the device while performing side-to-side balancing. The device may be placed on a hard ground surface (e.g. pavement) or a soft ground surface (e.g. wet sand of a beach) during performance of the method.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A board sport training device comprising a base configured for attachment to a platform such that the base is disposed beneath the platform and the base comprising a plurality of separate base portions, each base portion comprising at least two bowl-shaped pivot areas, the two bowl-shaped pivot areas of at least one of the base portions being formed of a rigid material wherein a strip of the material comprises a hinge which couples the two bowl-shaped pivot areas together and each base portion having flexibility to conform to a curved bottom surface of the platform, and a plurality of the pivot areas being positioned along a longitudinal axis of the platform and separated by a distance from the platform.

2. The device according to claim 1, wherein each of the base portions is removably attached to the platform by one or more straps.

3. The device according to claim 1, wherein the platform comprises a surfboard.

4. The device according to claim 1, wherein the base portions are identical to each other.

5. The device according to claim 1, wherein the base portions are stackable by the two bowl-shaped pivot areas of one or more of the base portions extending into two bowl-shaped pivot areas of another one of the base portions.

6. The device according to claim 5, wherein the base portions are identical to each other.

7. The device according to claim 1, further comprising structural ribbing on an jilter concave surface of the bowl-shaped pivot areas.

8. The device according to claim 1, wherein the at least one of the base portions further comprises a flexible material at a perimeter of the bowl-shaped portions for contacting the lower surface of the platform.

9. The device according to claim 8, wherein the flexible material occupies areas on either side of the strip.

10. A board sport training device comprising:
an elongated platform for receiving a user; and
a plurality of separate base portions disposed beneath the platform and the base portions each comprising at least two bowl-shaped pivot areas coupled to together by a hinge such that each base portion conforms to a curved surface of the platform, and a plurality of the pivot areas being positioned along a longitudinal axis of the platform and separated by a distance from the platform.

11. The device according to claim 10, wherein each of the base portions is removably attached to the platform by one or more straps.

12. The device according to claim 10, wherein the platform comprises a surfboard.

13. The device according to claim 10, wherein the base portions are identical to each other.

14. The device according to claim 10, wherein the base portions are stackable by the two bowl-shaped pivot areas of one or more of the base portions extending into two bowl-shaped pivot areas of another one of the base portions.

15. The device according to claim 10, wherein the base portions are identical to each other.

16. The device according to claim 10, wherein the two bowl-shaped pivot areas of at least one of the base portions are formed of a rigid material and the hinge comprises a strip of the substantially rigid material which couples the two bowl-shaped pivot areas together.

17. The device according to claim 16, further comprising structural ribbing on an inter concave surface of the bowl-shaped pivot areas.

18. The device according to claim 16, wherein the at least one of the base portions further comprises a flexible material at a perimeter of the bowl-shaped portions for contacting the lower surface of the platform.

19. The device according to claim 18, wherein the flexible material occupies areas on either side of the strip.

* * * * *